(12) United States Patent
Tour et al.

(10) Patent No.: US 9,283,511 B2
(45) Date of Patent: Mar. 15, 2016

(54) COMPOSITE MATERIALS FOR REVERSIBLE $CO_2$ CAPTURE

(75) Inventors: James M. Tour, Bellaire, TX (US); Garry Chih-Chau Hwang, Houston, TX (US); Jay R. Lomeda, Houston, TX (US)

(73) Assignees: WILLIAM MARSH RICE UNIVERSITY, Houston, TX (US); NALCO COMPANY, Naperville, IL (US)

( * ) Notice: Subject to any disclaimer, the term of this patent is extended or adjusted under 35 U.S.C. 154(b) by 46 days.

(21) Appl. No.: 13/881,428

(22) PCT Filed: Oct. 25, 2011

(86) PCT No.: PCT/US2011/057695
§ 371 (c)(1),
(2), (4) Date: Nov. 25, 2013

(87) PCT Pub. No.: WO2012/158194
PCT Pub. Date: Nov. 22, 2012

(65) Prior Publication Data
US 2014/0076158 A1    Mar. 20, 2014

Related U.S. Application Data

(60) Provisional application No. 61/406,381, filed on Oct. 25, 2010.

(51) Int. Cl.
*B01D 53/02* (2006.01)
*B01D 53/04* (2006.01)
(Continued)

(52) U.S. Cl.
CPC ............... *B01D 53/04* (2013.01); *B01D 53/02* (2013.01); *B01J 20/20* (2013.01); *B01J 20/261* (2013.01);
(Continued)

(58) Field of Classification Search
CPC .............. B01D 2253/102; B01D 2253/202; B01D 2253/25; B01D 2257/504; B01D 53/02; B01D 53/04; B01J 20/20; B01J 20/261; B01J 20/262; B01J 20/28069; B01J 20/2808; B01J 20/28083; B01J 20/28085; B01J 20/28097; B01J 20/327; B01J 20/3272; B01J 2220/46; Y02C 10/08
See application file for complete search history.

(56) References Cited

U.S. PATENT DOCUMENTS

| | | |
|---|---|---|
| 4,504,287 A | 3/1985 | Atlani et al. |
| 6,547,854 B1 | 4/2003 | Gray et al. |

(Continued)

FOREIGN PATENT DOCUMENTS

| | | |
|---|---|---|
| WO | 2012026755 | 3/2012 |
| WO | 2012158914 | 11/2012 |

OTHER PUBLICATIONS

Puxty et al., "Carbon Dioxide Postcombustion Capture: A Novel Screening Study of the Carbon Dioxide Absorption Performance of 76 Amines", Environ. Sci. Technol. 2009, 43, 6427-6433.
Siriwardane et al., "Adsorption of CO2 on Molecular Sieves and Activated Carbon" Energy Fuels, 2001, 15, 279-284.
Heuchel et al., "Adsorption of Carbon Dioxide and Methane and Their Mixtures on an Activated Carbon: Simulation and Experiment", Langmuir, 1999, 15, 8695-8705.
Fryxell et al., "Design and Synthesis of Selective Mesoporous Anion Traps", Chem. Mater. 1999, 11, 2148-2154.

(Continued)

*Primary Examiner* — Christopher P Jones
(74) *Attorney, Agent, or Firm* — Winstead PC

(57) ABSTRACT

Composite materials for carbon dioxide (C02) capture that include: (1) a mesoporous carbon source; and (2) an in situ polymerized polymer that is associated with the mesoporous carbon source, where the in situ polymerized polymer is selected from the group consisting of thiol-based polymers, amine-based polymers, and combinations thereof. Methods of making the composite materials for C02 capture include: (1) associating a mesoporous carbon source with monomers, where the monomers are selected from the group consisting of thiol-based monomers, amine-based monomers, and combinations thereof; and (2) polymerizing the monomers in situ to form said composite materials. Further embodiments of the present invention pertain to methods of capturing C02 from an environment by associating the environment with one or more of the aforementioned composite materials.

23 Claims, 7 Drawing Sheets

(51) Int. Cl.
*B01J 20/20* (2006.01)
*B01J 20/26* (2006.01)
*B01J 20/28* (2006.01)
*B01J 20/32* (2006.01)

(52) U.S. Cl.
CPC ............ *B01J 20/262* (2013.01); *B01J 20/2808* (2013.01); *B01J 20/28069* (2013.01); *B01J 20/28083* (2013.01); *B01J 20/28085* (2013.01); *B01J 20/28097* (2013.01); *B01J 20/327* (2013.01); *B01J 20/3272* (2013.01); *B01D 2253/102* (2013.01); *B01D 2253/202* (2013.01); *B01D 2253/25* (2013.01); *B01D 2257/504* (2013.01); *B01J 2220/46* (2013.01); *Y02C 10/08* (2013.01)

(56) References Cited

U.S. PATENT DOCUMENTS

| | | |
|---|---|---|
| 6,585,948 B1 | 7/2003 | Ryoo et al. |
| 6,592,764 B1 | 7/2003 | Stucky et al. |
| 6,908,497 B1 | 6/2005 | Sirwardane et al. |
| 8,114,372 B2 | 2/2012 | Pak et al. |
| 8,133,305 B2 | 3/2012 | Lackner et al. |
| 8,277,767 B2 | 10/2012 | Ariya-Far |
| 2003/0221555 A1 | 12/2003 | Golden et al. |
| 2004/0045434 A1 | 3/2004 | Golden et al. |
| 2008/0210901 A1 | 9/2008 | Giannantonio et al. |
| 2008/0276804 A1 | 11/2008 | Sayari et al. |
| 2009/0038632 A1 | 2/2009 | Cashmore et al. |
| 2009/0169452 A1 | 7/2009 | Constantz et al. |
| 2010/0029466 A1 | 2/2010 | Woodhouse |
| 2010/0061904 A1 | 3/2010 | Lund et al. |
| 2010/0062926 A1 | 3/2010 | Woodhouse et al. |
| 2010/0139536 A1 | 6/2010 | Woodhouse et al. |
| 2010/0154636 A1 | 6/2010 | Liu et al. |
| 2010/0155335 A1 | 6/2010 | Taboada-Serrano et al. |
| 2010/0212495 A1 | 8/2010 | Gadkaree et al. |
| 2011/0005390 A1 | 1/2011 | Haugan |
| 2011/0059000 A1 | 3/2011 | Constantz et al. |
| 2011/0088553 A1 | 4/2011 | Woodhouse et al. |
| 2011/0150730 A1 | 6/2011 | Baugh et al. |
| 2011/0172084 A1 | 7/2011 | Jang et al. |
| 2011/0172412 A1 | 7/2011 | Serre et al. |
| 2011/0174507 A1 | 7/2011 | Burnham et al. |
| 2011/0179948 A1 | 7/2011 | Choi et al. |
| 2011/0230334 A1 | 9/2011 | Goldberg et al. |
| 2011/0308389 A1 | 12/2011 | Graff et al. |
| 2012/0048111 A1 | 3/2012 | Nakao et al. |
| 2012/0125196 A1 | 5/2012 | Woodhouse et al. |
| 2012/0308456 A1 | 12/2012 | Leta et al. |

OTHER PUBLICATIONS

Yoshitake et al.,"Adsorption of Chromate and Arsenate by Amino-Functionalized MCM-41 and SBA-1" Chem. Mater. 2002, 14, 4603-4610.

Xu et al., "Preparation and characterization of novel CO2 'molecular basket' adsorbents based on polymer-modified mesoporous molecular sieve MCM-41", Microporous Mesoporous Mater. 2003, 62, 29-45.

Caskey et al., "Dramatic Tuning of Carbon Dioxide Uptake via Metal Substitution in a Coordination Polymer with Cylindrical Pores", J. Am. Chem. Soc. 2008, 130, 10870-10871.

McDonald et al., "Enhanced carbon dioxide capture upon incorporation of N,N-dimethylethylenediamine in the metal-organic framework CuBTTri" Chem. Sci. 2011, 2, 2022-2028.

Lee et al., "Synthesis of new nanoporous carbon materials using nanostructured silica materials as templates", J. Mater. Chem. 2004, 14, 478-486.

Ryoo et al., "Ordered Mesoporous Carbons", Adv. Mater. 2001, 13, 677-681.

Kyotani et al., "Control of pore structure in carbon", Carbon 2000, 38, 269-286.

Choi et al., "Ordered nanoporous polymer—carbon composites", Nature Mater. 2003, 2, 473-476.

Zhao et al., "Triblock Copolymer Syntheses of Mesoporous Silica with Periodic 50 to 300 Angstrom Pores", Science 1998, 279, 548-552.

Joo et al., "Ordered nanoporous arrays of carbon supporting high dispersions of platinum nanoparticles", Nature 2001, 412, 169-172.

Mello et al., "Amine-modified MCM-41 mesoporous silica for carbon dioxide capture" Micropor. Mesopor. Mater., 2011, 143, 174-179.

Xu et al., "Novel Polyethylenimine-Modified Mesoporous Molecular Sieve of MCM-41 Type as High-Capacity Adsorbent for CO2 Capture" Energy Fuels, 2002, 16, 1463-1469.

Choi et al., "Adsorbent Materials for Carbon Dioxide Capture from Large Anthropogenic Point Sources" ChemSusChem, 2009, 2, 796-854.

Ma et al., "'Molecular Basket' Sorbents for Separation of CO2 and H2S from Various Gas Streams", J. Am. Chem. Soc., 2009, 131, 5777-5783.

Dillon et al., "Synthesis, Characterization, and Carbon Dioxide Adsorption of Covalently Attached Polyethyleneimine-Functionalized Single-Wall Carbon Nanotubes", ACS Nano, 2008, 2, 156-164.

Jun et al., "Synthesis of New Nanoporous Carbon with Hexagonally Ordered Mesostructure", J. Am. Chem. Soc., 2000, 122, 10712-10713.

Chang et al., "In-Situ Infrared Study of CO2 Adsorption on SBA-15 Grafted with γ-Aminopropyltriethoxysilane", Energy Fuels, 2003, 17, 468-473.

National Aeronautics and Space Administration brochure entitled "International Space Station Environmental Control and Life Support System." 2008.

International Search Report and Written Opinion for PCT/US2011/057695. Mailed on Aug. 10, 2012.

International Preliminary Report on Patentability for PCT/US2011/057695. Mailed on May 10, 2013.

International Search Report and Written Opinion for PCT/US2013/021239, Mailed on Mar. 22, 2013.

International Search Report and Written Opinion for PCT/US2014/044315, Mailed on Jan. 1, 2015.

Mishra et al., "Nanomagnetite decorated multiwalled carbon nanotubes: a robust nanomaterial for enhanced carbon dioxide adsorption" Energy and Environmental Sciences, 2011, 4, 889-895.

Huwe et al., "Iron (III) oxide nanoparticles within the pore system of mesoporous carbon CMK-1: intra-pore synthesis and characterization", Microporous and Mesoporous Materials 60 (2003) 151-158.

AMINE-CMK-3 COMPOSITE FOR CO$_2$ SEQUESTERATION

COMPOSITE MATERIALS FOR REVERSIBLE $CO_2$ CAPTURE

CROSS-REFERENCE TO RELATED APPLICATIONS

This application claims priority to U.S. Provisional Patent Application No. 61/406,381, filed on Oct. 25, 2010. The entirety of the above-identified provisional application is incorporated herein by reference.

STATEMENT REGARDING FEDERALLY SPONSORED RESEARCH

This invention was made with government support under Grant No. N00014-09-1-1066, awarded by the U.S. Department of Defense. The government has certain rights in the invention.

BACKGROUND OF THE INVENTION

Traditional $CO_2$ adsorbents show limited $CO_2$ adsorption and regeneration capacities. Furthermore, $CO_2$ emissions from fuel combustion have been growing rapidly. Therefore, an ongoing industrial need exists for the development of more effective $CO_2$ adsorbents.

BRIEF SUMMARY OF THE INVENTION

In some embodiments, the present invention provides composite materials for $CO_2$ capture. Such composite materials generally include: (1) a mesoporous carbon source; and (2) an in situ polymerized polymer that is associated with the mesoporous carbon source. In some embodiments, the mesoporous carbon source is selected from the group consisting of amorphous carbons, carbon black, porous carbon blacks, activated carbons, and combinations thereof. In some embodiments, the mesoporous carbon source is CMK-3. In some embodiments, the in situ polymerized polymer is an amine-based polymer that is selected from the group consisting of polyethylenimines, polyvinylamines, polyaziridines, N-substituted polyaziridines, poly(N-vinylformamide), Jeffamines (available from Huntsman Corporation, The Woodlands, Tex.), and combinations thereof. In some embodiments, the in situ polymerized polymer is a thiol-based polymer that is selected from the group consisting of polyalkylthiols, polydialkylthiols, polyarylthiols, and combinations thereof.

In additional embodiments, the present invention provides methods of making the aforementioned composite materials for $CO_2$ capture. Such methods generally include: (1) associating a mesoporous carbon source with monomers; and (2) polymerizing the monomers in situ to form in situ polymerized polymers associated with the mesoporous carbon source. In some embodiments, the method also includes a step of hydrolyzing the formed composites. In some embodiments, the monomers are amine-based monomers that are selected from the group consisting of 2-methyl-2-oxazoline, N-vinyl formamide, aziridine, and combinations thereof. In some embodiments, the monomers are thiol-based monomers that are selected from the group consisting of alkylthiols, dialkylthiols, arylthiols, thioepoxides, vinylthioacetates, and combinations thereof. In some embodiments, the $CO_2$ capture is reversible.

Additional embodiments of the present invention pertain to methods of capturing $CO_2$ from an environment. Such methods generally include associating the environment with one or more of the above-described composite materials.

The methods and composites of the present invention have numerous applications and advantages. For instance, the composites of the present invention have been shown to have effective $CO_2$ capture capacities, stability, reversibility, usability, and $CO_2$ selectivity. Such composites can in turn be used to capture $CO_2$ from numerous environments, including natural and artificial gas streams and flue gas streams.

BRIEF DESCRIPTION OF THE FIGURES

FIG. 1 provides schemes for producing composites for $CO_2$ capture.

DETAILED DESCRIPTION OF EXEMPLARY EMBODIMENTS

Figure 1A:
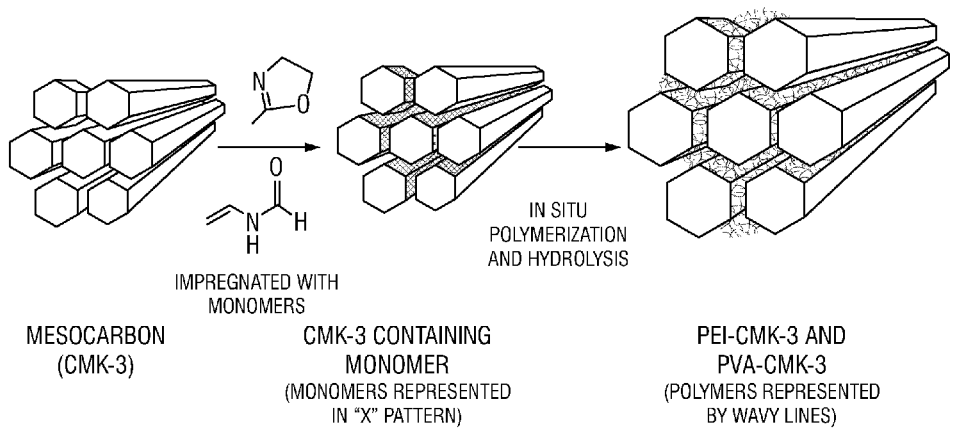
FIG. 1A provides a scheme of a process to produce mesoporous polymer-carbon composites polyethylenimine-mesocarbon (PEI-CMK-3) and polyvinylamine-mesocarbon (PVA-CMK-3).

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. Furthermore, the terms "sequestration", "sequester", "adsorption", "absorption", "uptake" and "capture" are used interchangeably in the application.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Traditional $CO_2$ adsorbents show limited $CO_2$ adsorption and regeneration capacities. Since the industrial revolution, $CO_2$ emissions from fuel combustion have been growing rapidly. The increased $CO_2$ concentration in the atmosphere might contribute to apparent global warming and serious climate change. Reducing $CO_2$ emissions from industrial and natural gas streams therefore becomes an important issue. Furthermore, capture of $CO_2$ from atmospheric pressure environments is important in life-support systems in space and under water where compression is discouraged due to the energy penalty.

Recently, $CO_2$ separation and capture have been receiving significant attention. Several chemical and physical methods were developed for $CO_2$ separation at near atmospheric pressure. For instance, liquid sorbents made by aqueous amine species have been developed for commercial $CO_2$ separation. Even though aqueous amines have low cost and high efficacy, their regeneration requires high energy input. In keeping with the worldwide trend toward safer and cleaner processes, more environment-friendly and less energy intensive solid sorbents are being developed to replace the conventional liquid sorbents.

Traditional $CO_2$ adsorbents, such as PEI supported silica, show good $CO_2$ sorption capacities. However, a drawback of such adsorbents is that it needs much more energy to regenerate it. Carbon materials, such as activated carbon or PEI modified single-walled carbon nanotubes, are also adapted to be gas adsorbents. However, such carbon materials are not readily modifiable due to their limited surface areas and disordered structures. Thus, the $CO_2$ adsorption capacities of many carbon materials remain limited. This necessitates the need for the development of new $CO_2$ adsorbents.

Activated carbon, one of the most common solid sorbents, is an extremely porous material that has been widely used as an industrial sorbent because of its high surface area and relatively high $CO_2$ capacity. Unfortunately, activated carbon has poorly controlled pore size distribution as well as a small pore volume, limiting its usefulness in $CO_2$ absorption. The grafting of amine functionalities onto a well-ordered solid support with a high surface area would combine the attractive features of the liquid sorbents with those of the solid sorbents. Accordingly, many types of amine-functionalized porous materials, such as M41S mesoporous silicas, have been used for $CO_2$ capture due to their high surface area and tunable pore sizes. For instance, Scaroni et al. invented "molecular basket" $CO_2$ adsorbents based on the solid sorbent MCM-41 modified with polyethylenimine (*Microporous Mesoporous Mater.* 2003, 62, 29-45). This material had a ~3.0 mmol/g (~11.7 wt %) $CO_2$ capacity at 75° C. Since the amine species were physisorbed on the support through impregnation rather than covalent modification, there is concern regarding the materials' long-term stability over many reuse cycles since desorption of the amine functionalization might occur. Metal oxide frameworks (MOFs) are a class of capture materials that can reach ~25% $CO_2$ uptake by weight, but their ability to capture $CO_2$ in the presence of small hydrocarbons might be limited due to their poorer selectivity. Therefore, an ongoing industrial need exists for the development of more effective $CO_2$ adsorbents.

In some embodiments, the present invention provides novel composite materials for $CO_2$ capture. Such composite materials generally include: (1) a mesoporous carbon source; and (2) an in situ polymerized polymer that is associated with the mesoporous carbon source. In some embodiments, the composite material is a polyethylenimine-mesocarbon (PEI-CMK-3) or a polyvinylamine-mesocarbon (PVA-CMK-3).

In additional embodiments, the present invention provides methods of making composite materials for $CO_2$ capture. Such methods generally include: (1) associating a mesoporous carbon source with a monomer; and (2) polymerizing the monomer in situ to form polymers associated with the mesoporous carbon source. FIG. 1A provides non-limiting examples of such methods. As shown, monomers of PEI and PVA precursors (2-methyl-2-oxazoline and N-vinylformamide monomers, respectively) fill the mesopores of CMK-3 by capillary condensation. The precursors are subsequently converted to cross-linked polyethylenimines and polyvinylamines after in situ polymerization and hydrolysis to form PEI-CMK-3 and PVA-CMK-3.

Figure 1B:
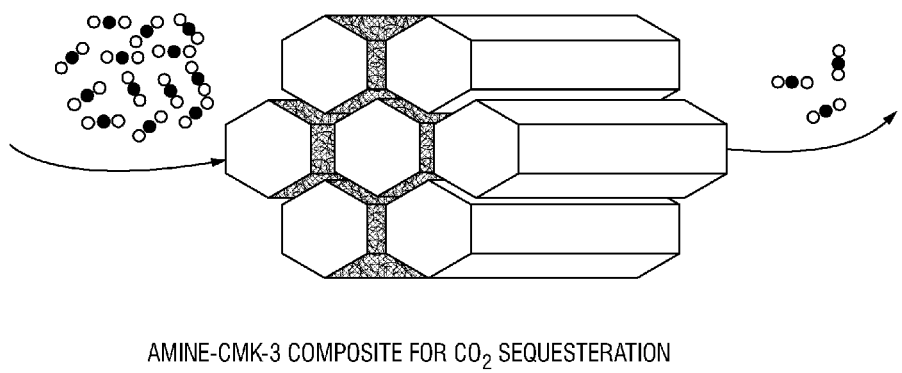
FIG. 1B provides a scheme showing the use of the composites for $CO_2$ capture.

Additional embodiments of the present invention pertain to methods of capturing $CO_2$ from an environment by associating the environment with one or more of the composite materials of the present invention. See, e.g., FIG. 1B. As set forth in more detail in the Examples below, Applicants studied $CO_2$ uptake of the PEI-CMK-3 and PVA-CMK-3 composites. The results indicated a 12-13 wt % $CO_2$ uptake capacity by the composites. Furthermore, the composites showed effective regeneration and reusability. For instance, even after seven consecutive $CO_2$ sorption-desorption cycles, only a minor decrease (<1 wt %) was detected in $CO_2$ sorption. The composites also showed selectivity for $CO_2$ uptake.

Reference will now be made to more specific and non-limiting embodiments of the present invention.

Composite Materials

Composite materials of the present invention that can be used for $CO_2$ capture generally include: (1) a mesoporous carbon source; and (2) an in situ polymerized polymer that is associated with the mesoporous carbon source. In some embodiments, the composite material is PEI-CMK-3. In some embodiments, the composite material is PVA-CMK-3. In some embodiments, the mesoporous carbon source is derived from nanometer-sized carbon black that has been made mesoporous by treatment with hydroxide.

Mesoporous Carbon Sources

Mesoporous carbon sources generally refer to carbon sources that are porous. In some embodiments, the mesoporous carbon sources have pore diameters that range from about 2 nm to about 50 nm. In some embodiments, the mesoporous carbon sources have pore diameters that range from about 5 nm to about 100 nm. In various embodiments, mesoporous carbon sources have pore diameters that range from about 1 micron to about 10 microns, or from about 0.1 microns to about 1 micron. In more specific embodiments, the mesoporous carbon sources have pore diameters that are about 15 nm.

Various mesoporous carbon sources can be used in the composites of the present invention. In some embodiments, the mesoporous carbon source is at least one of amorphous carbons, carbon black, hydroxide-treated carbon black, porous carbon black, activated carbons, and combinations thereof. In further embodiments, the mesoporous carbon source is derived from micron-sized carbon black particles or nanometer-sized carbon black particles that have been made mesoporous by treatment with hydroxide. In some embodiments, such mesoporous carbon sources have pore diameters of about 15 nm. In more specific embodiments, the mesoporous carbon source is at least one of graphitized carbon black, powdered activated carbons, granular activated carbons, extruded activated carbons, bead activated carbons, polymer coated activated carbons, metal-impregnated activated carbons, and combinations thereof. In some embodiments, the mesoporous carbon source is CMK-3. In some embodiments, the mesoporous carbon source is CMK-5.

In Situ Polymerized Polymers

In situ polymerized polymers generally refer to polymers that have been polymerized in the presence of a mesoporous carbon source. Various in situ polymerized polymers may be used in the composites of the present invention. In some embodiments, the in situ polymerized polymer is an amine-based polymer, a thiol-based polymer, or combinations of such polymers. Amine-based polymers generally refer to polymers that have at least one amine group or a derivative of an amine group. Thiol-based polymers generally refer to polymers that have at least one thiol group or a derivative of a thiol group. Without being bound by theory, Applicants envision that the amine and thiol functional groups in the amine-based and thiol-based polymers facilitate $CO_2$ capture by acting as nucleophiles toward the $CO_2$.

In some embodiments, the in situ polymerized polymer is an amine-based polymer. Examples of amine-based polymers include, without limitation, polyethylenimines, polyvinylamines, polyaziridines, polyalkylamines, polydialylamines, polyarylamines, polyalkylarylamines, polydiarylamines, N-substituted polyaziridines, poly(N-vinylformamide), Jeffamines, and combinations thereof.

In some embodiments, the in situ polymerized polymer is a thiol-based polymer. Examples of thiol-based polymers include, without limitation, polyalkylthiols, polydialkylthiols, polyarylthiols, and combinations thereof. In some embodiments, thiol-based polymers can be made by the polymerization of thioepoxides or vinylthioacetates ($CH_2$=CHSCOCH$_3$) followed by hydrolysis.

In some embodiments, the in situ polymerized polymer is polyethylenimine. In some embodiments, the in situ polymerized polymer is polyvinylamine. In some embodiments, the in situ polymerized polymer is a linear polymer. In some embodiments, the in situ polymerized polymer is a hydrolyzed polymer. In some embodiments, the in situ polymerized polymer is a polyamine. In some embodiments, the polyamine has three or more amine groups.

In some embodiments, the in situ polymerized polymer is a branched polymer. Without being bound by theory, Applicants envision that the use of branched polymers in the composites of the present invention can lead to better $CO_2$ capture.

In some embodiments, the in situ polymerized polymers are embedded within the mesoporous carbon sources. In some embodiments, the polymers are primarily confined within the pores of the mesoporous carbon sources. In some embodiments, the polymers are embedded within the pores of the mesoporous carbon sources. In some embodiments, the resultant polymers form interpenetrating and inseparable composite frameworks with the mesoporous carbon sources.

Methods of Making Composite Materials

Additional embodiments of the present invention pertain to methods of making the aforementioned composite materials for $CO_2$ capture. In some embodiments, the methods include: (1) associating a mesoporous carbon source with monomers; and (2) polymerizing the monomers in situ (e.g., in the presence of the mesoporous carbon source). Additional embodiments of the present invention also include a step of hydrolyzing the formed composites.

Associating Mesoporous Carbon Sources with Monomers

Various methods may be used to associate mesoporous carbon sources with monomers. In some embodiments, the step of associating involves mixing the mesoporous carbon source with monomers either in the gas phase or in solution. In some embodiments, the association results in the filling of the mesopores with the monomers by capillary condensation.

Various monomers may be associated with mesoporous carbon sources. In some embodiments, the monomers are amine-based monomer. Examples of amine-based monomers include, without limitation, 2-methyl-2-oxazoline, N-vinyl formamide, aziridine, and combinations thereof. In some embodiments, the amine-based monomer is 2-methyl-2-oxazoline. In some embodiments, the amine-based monomer is N-vinyl formamide.

In some embodiments, the monomers are thiol-based monomers. Examples of thiol-based monomers include, without limitation, alkylthiols, dialkylthiols, arylthiols, thioepoxides, vinylthioacetates, and combinations thereof. In other embodiments, the monomers are a combination of amine-based monomers and thiol-based monomers.

Polymerization

Various methods may also be used to polymerize the monomers in situ in the presence of mesoporous carbon sources. In some embodiments, the polymerization may be initiated by the addition of a catalyst to the monomers. In some embodiments, the catalyst is a Lewis acid, such as $BF_3 \cdot Et_2O$. In other embodiments, the catalyst is a Bronstead acid, such as $H^+$ derived from sulfuric acid or hydrochloric acid. In some embodiments, the catalyst is a base, such as a hydroxide, an alkoxide or an amine. In some embodiments, the catalyst is a free radical initiator, such as 2,2'-azobis(2-methylpropionitrile) (AIBN), di(tert-butyl)peroxide, or di(benzoyl)peroxide. Additional suitable catalysts include, without limitation, compounds containing an azo group (—N=N—), a disulfide group (—S—S—), or a peroxide group (—O—O—) (e.g., benzoyl peroxide).

In some embodiments, the polymerization may be primarily confined within the pores of the mesoporous carbon sources. In some embodiments, the formed polymers may become embedded within the pores of the mesoporous carbon sources.

In some embodiments, polymerization leads to the formation of in situ polymerized, amine-based polymers (i.e., when amine-based monomers are used). In some embodiments, polymerization leads to the formation of in situ polymerized, thiol-based polymers (i.e., when thiol-based monomers are used). In some embodiments, polymerization leads to the formation of in situ polymerized, thiol-based and amine-based polymers (i.e., when thiol-based and amine-based monomers are used).

Hydrolysis

In some embodiments, the formed composite materials of the present invention may also be hydrolyzed. In some embodiments, such a hydrolysis step may be desired in order to expose or deprotect amine or thiol groups within a polymer.

Various methods may be used to hydrolyze the formed composites. In some embodiments, the hydrolysis step involves the addition of a hydrogen containing solution to the composite. In some embodiments, the hydrogen containing solution is at least one of an acidic solution (e.g., hydrochloric acid), a basic solution (e.g., sodium hydroxide), a neutral solution, an aqueous solution, a non-aqueous solution, and combinations thereof.

In some embodiments, the hydrogen containing solution is a basic solution. Non-limiting examples of basic solutions include solutions containing sodium hydroxide (NaOH), potassium hydroxide (KOH), barium hydroxide ($Ba(OH)_2$), caesium hydroxide (CsOH), calcium hydroxide ($Ca(OH)_2$), magnesium hydroxide ($Mg(OH)_2$), lithium hydroxide (LiOH), and combinations thereof. In some embodiments, the basic solution is NaOH.

In some embodiments, the hydrogen containing solution is an acidic solution. Non-limiting examples of acidic solutions include solutions containing sulfuric acid ($H_2SO_4$), fluorosulfuric acid ($HSO_3F$), nitric acid ($HNO_3$), phosphoric acid ($H_3PO_4$), fluoroantimonic acid ($HSbF_6$), fluoroboric acid ($HBF_4$), hexafluorophosphoric acid ($HPF_6$), boric acid ($H_3BO_3$), acetic acid ($CH_3COOH$), citric acid ($C_6H_8O_7$), formic acid (HCOOH), gluconic acid ($HOCH_2-(CHOH)_4-COOH$), lactic acid ($CH_3-CHOH-COOH$), oxalic acid (HOOC—COOH), tartaric acid (HOOC—CHOH—CHOH—COOH), hydrochloric acid (HCl), hydrofluoric acid (HF), hydrobromic acid (HBr), hydroiodic acid (HI), hypochlorous acid (HClO), chlorous acid ($HClO_2$), chloric acid ($HClO_3$), perchloric acid ($HClO_4$), and combinations thereof. In more specific embodiments, the acidic solution is HCl.

Methods of Capturing $CO_2$ from an Environment

Additional embodiments of the present invention pertain to methods of capturing $CO_2$ from an environment by utilizing the composites of the present invention. $CO_2$ capture generally refers to the reversible or irreversible capture of $CO_2$ from an environment. In some embodiments, $CO_2$ capture involves the capture and programmed rapid release of $CO_2$ from an environment. In some embodiments, $CO_2$ capture involves the sequestration of $CO_2$ from an environment. In some embodiments, $CO_2$ capture involves the adhesion of $CO_2$ to the composites of the present invention. In some embodiments, the $CO_2$ capture is reversible.

In some embodiments, $CO_2$ is captured from an environment by associating the environment with a composite of the present invention (as previously described). In some embodiments, the associating includes incubating the environment with a composite. In some embodiments, the environment is an industrial gas stream. In some embodiments, the environment is a natural gas stream. In some embodiments, the environment is an underwater environment. In some embodiments, the environment is a flue gas stream.

In some embodiments, the environment is an oil field. In such embodiments, the methods of the present invention may be used to capture $CO_2$ from oil fields.

In various embodiments, the composites of the present invention have a $CO_2$ absorption capacity from about 10% to about 100% of the composite weight. In some embodiments, the composites of the present invention have a $CO_2$ absorption capacity of about 15% of the composite weight. In more specific embodiments, the composites of the present invention have a $CO_2$ absorption capacity of about 13.4% of the composite weight.

In various embodiments, the composites of the present invention are able to regenerate $CO_2$ absorption capacity after $CO_2$ release. In some embodiments, the composites of the present invention can regenerate $CO_2$ absorption capacity through heating at low temperatures (e.g., less than about 70° C.). In some embodiments, the composites of the present invention exhibit stability over repetitive adsorption-desorption cycles. In some embodiments, the composites of the present invention exhibit $CO_2$ selectivity over other gases (e.g., alkane gases).

Additional Embodiments

Reference will now be made to more specific embodiments of the present disclosure and experimental results that provide support for such embodiments. However, Applicants note that the disclosure below is for exemplary purposes only and is not intended to limit the scope of the claimed invention in any way.

The Examples below pertain to the in situ synthesis of polymer-modified mesoporous carbon (CMK-3) composites for $CO_2$ capture. Particularly, the Examples below report carbon-based composites polyethylenimine-mesocarbon (PEI-CMK-3) and polyvinylamine-mesocarbon (PVA-CMK-3) that can be used to capture and rapidly release $CO_2$. $CO_2$ uptake by the synthesized composites was determined using a gravimetric method at room temperature and atmospheric pressure. The 39% PEI-CMK-3 composite had ~12 wt % $CO_2$ uptake capacity and the 37% PVA-CMK-3 composite had ~13 wt % $CO_2$ uptake capacity. A desorption temperature of 75° C. was sufficient for regeneration. The $CO_2$ uptake was the same when using 10% $CO_2$ in a 90% $CH_4$, $C_2H_6$ and $C_3H_8$ mixture.

Over the last few decades, there have been significant advances in the synthesis of mesoporous carbon materials, such as CMK-3 and CMK-5. For instance, Ryoo et al. proposed a practical method through in situ polymerization to synthesize polymer-CMK-3 composites (*Nature Mater.* 2003, 2, 473-476). The mesocarbon CMK-3 is different from conventional carbon materials such as activated carbon due to its highly ordered meso-structure and high surface area. This allowed for the chemical properties of these composites to be maintained while greatly enhancing their thermal stability. To improve upon the aforementioned work, Applicants developed a route to synthesize polymer-mesocarbon composites that would lead to higher degrees of $CO_2$ adsorption by the in situ polymerization of amine species to produce polyethylenimine (PEI) and polyvinylamine (PVA) inside the mesocarbon CMK-3. In addition to a high efficiency for $CO_2$ capture, they should also exhibit high stability due to the formation of interpenetrating composite frameworks between the entrapped polymers and mesocarbon CMK-3. Moreover, their uptake of small hydrocarbons should be minimal, making them suitable for use in $CO_2$ capture from natural gas streams.

EXAMPLE 1

Synthesis of PEI-CMK-3 and PVA-CMK-3 Composites

Here, mesoporous silica SBA-15 synthesized by the surfactant-assisted method was used as a hard template to prepare mesoporous carbon CMK-3. FIG. 1 demonstrates the synthesis route to the desired polymer-mesocarbon composites PEI-CMK-3 and PVA-CMK-3.

For the synthesis of the PEI-CMK-3 composite, the as-synthesized CMK-3 was suspended in a solution containing 2-methyl-2-oxazoline monomers and acetonitrile. The monomers started filling the mesopores by capillary condensation, and the wall surface of the CMK-3 was coated with a thin film of monomers after evaporation of the acetonitrile at 80° C. $BF_3.Et_2O$ as a catalyst was subsequently added for the polymerization step.

A similar methodology was carried out for the PVA-CMK-3 synthesis except N-vinylformamide and 2,2'-azobis (2-methylpropionitrile) (AIBN) were used as the monomer and catalyst, respectively. The polymer-CMK-3 composites needed to be further hydrolyzed, thus becoming the PEI-CMK-3 and PVA-CMK-3 composites. More details are described in the experimental section.

The TEM and SEM pictures of the PEI-CMK-3 and PVA-CMK-3 composites are shown in FIG. 1. The XRD pattern (inset) exhibited Bragg diffraction peaks in the 2θ=~1.0° and 1.5°, reflecting the synthesized composite has well-ordered mesoporous channel structure.

Figure 2A:
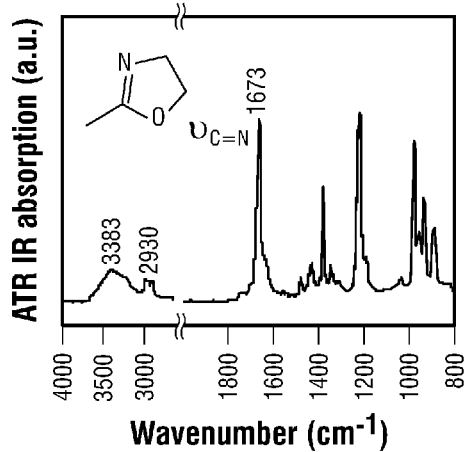
FIG. 2 is an attenuated total reflectance infrared (ATR-IR) analysis and solid-state $^1H$-$^{13}C$ CPMAS NMR spectra for PEI-CMK-3 (FIGS. 2A-C and G) and PVA-CMK-3 (FIGS. 2D-F and H) during the synthetic processes.
Figure 2B:
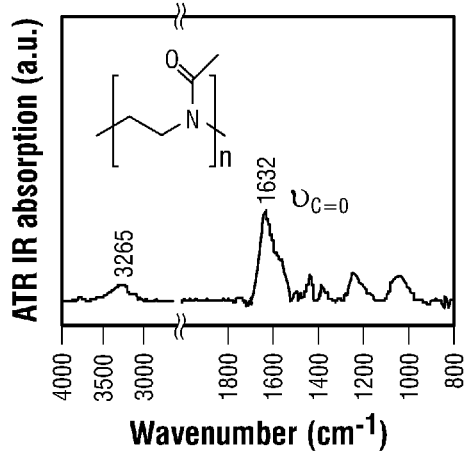

Attenuated total reflectance infrared (ATR-IR) analysis and $^{13}C$ NMR analysis were chosen to monitor the resultant composites during the synthetic processes. FIG. 2A is the IR spectrum from CMK-3 impregnated with 2-methyl-2-oxazoline. The spectrum has a characteristic absorption band at 1673 cm$^{-1}$ that can be assigned to a symmetric stretching mode of C=N from the 2-methyl-2-oxazoline. The presence of the N-substituted polyaziridine, generated from the ring opening of 2-methyl-2-oxazoline can be evidenced by a development of the characteristic C=O stretching at 1632 cm$^{-1}$, as well as by a disappearance of the original C=N vibration (FIG. 2B).

Figure 2C:
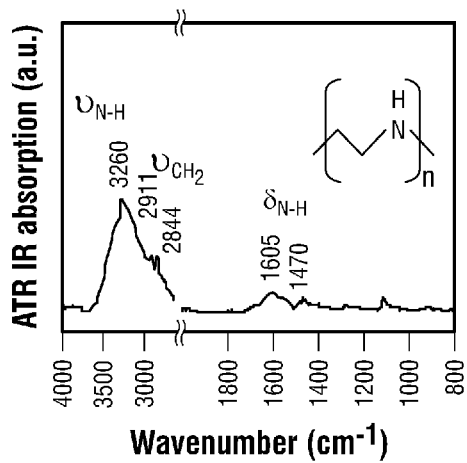
Figure 2D:
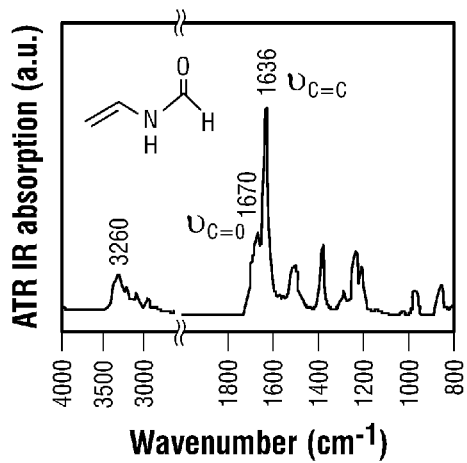
Figure 2E:
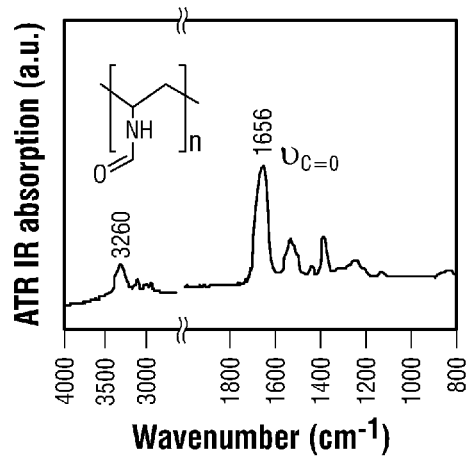
Figure 2F:
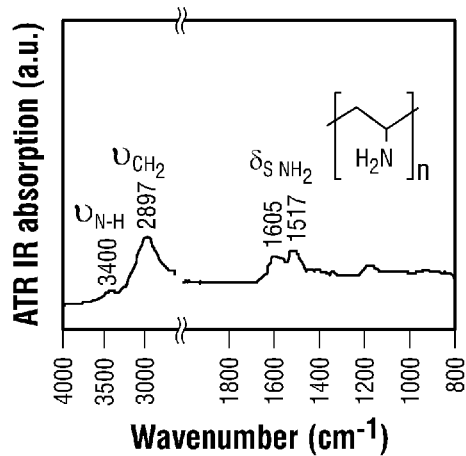

FIG. 2C is a spectrum of the composite after hydrolysis with aqueous NaOH for 12 h. The characteristic peaks of the N-substituted polyaziridine from FIG. 2B are replaced by peaks at 3260 and 1605 cm$^{-1}$ that are assigned to N—H stretching and bending, respectively, from the secondary amine. In FIG. 2D, a sharp peak together with a shoulder appear at 1636 and 1670 cm$^{-1}$, corresponding to the C=C and C=O symmetric stretching from the N-vinylformamide monomers in CMK-3. FIG. 2E shows a strong peak centered at 1656 cm$^{-1}$ that is due to C=O stretching from the poly(N-vinylformamide) in the CMK-3 composite after the in situ polymerization. The structure of the PVA-CMK-3 composite was confirmed by the peaks around 3400 and 1605 cm$^{-1}$ in FIG. 2F due to the N—H stretching and NH$_2$ scissoring on the primary amine, respectively.

Figure 2G:
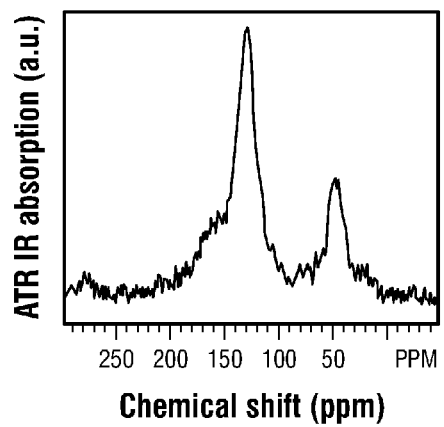
Figure 2H:
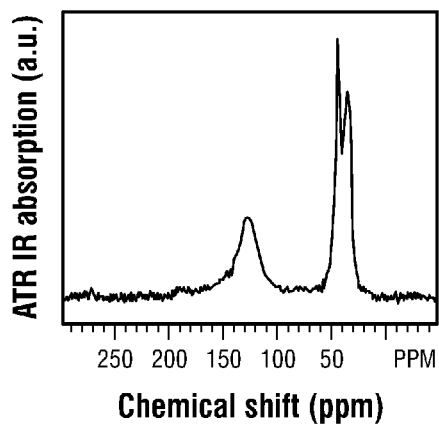

The molecular structures of PEI-CMK-3 and PVA-CMK-3 composites were further investigated by solid-state NMR analysis. $^{13}$C MAS NMR spectra were acquired using $^1$H—$^{13}$C cross polarization (CPMAS) with contact time of 1 ms. FIG. 2G shows that the PEI-CMK-3 composite has two main signals observed at δ~126 ppm and δ~45 ppm corresponding to sp$^2$-carbons from CMK-3 itself and to the —CH$_2$— units of linear PEI, respectively. A minor shoulder around 165 ppm assigned to the carbamate is assumed through the composite reaction with CO$_2$ from the atmosphere during its storage. For the PVA-CMK-3 composite, the three carbon atom resonance peaks shown in FIG. 2H were assigned as follows: a sp$^2$-carbon peak (δ~130 ppm) from CMK-3 itself, a strong (δ~46 ppm) and a medium resonance (δ~38 ppm) attributed to the methine- and methylene moieties of the PVA main chain.

Figure 3A:
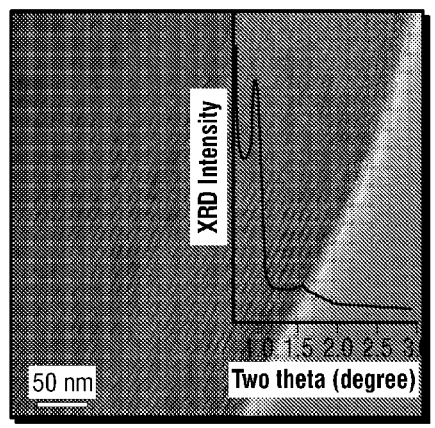
FIG. 3 provides scanning electron microscopy (SEM) and transmission electron microscopy (TEM) images of PEI-CMK-3 and PVA-CMK-3 composites. The TEM (FIG. 3A) and SEM (FIG. 3B) images are taken from the 39% PEI-CMK-3. The crystalline structure for the PEI-CMK-3 was observed by powder XRD (inset of a).
FIG. 3C is an SEM image of the 37% PVA-CMK-3 composite. The scale bars for FIGS. 3A-C are 50 nm, 20 μm and 20 μm, respectively.
Figure 3B:
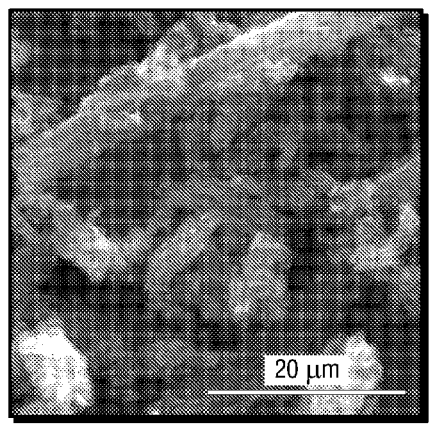
Figure 3C:
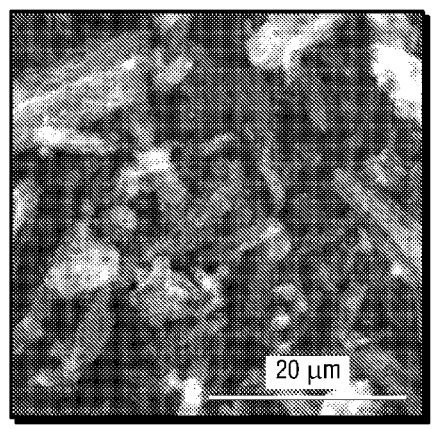

Transmission electron microscopy (TEM) and scanning electron microscopy (SEM) analyses were conducted to determine the morphologies and microstructures of the synthesized polymer-CMK-3 composites. A TEM image of the 39% PEI-CMK-3 parallel to the pore direction is shown in FIG. 3A. The small angle X-ray diffraction pattern (inset) clearly reveals the presence of hexagonally ordered porous structures for the produced polymer-CMK-3 composites. These ordered porous structures remain even after polymerization and hydrolysis. FIGS. 3B-3C are SEM images taken of PEI-CMK-3 and PVA-CMK-3, respectively. Little bulk aggregation of polymer was observed on the outer surface, which means that the polymerization of PEI and PVA is primarily confined within the pores of the CMK-3. The resultant polymers form interpenetrating and inseparable composite frameworks with CMK-3, in good agreement with the high stability results obtained from the CO$_2$ adsorption cycle study.

The porous nature of the polymer-CMK-3 composites was further characterized by liquid nitrogen adsorption isotherms, which allow calculation of specific surface area, pore volume and pore size distribution. See Table 1.

TABLE 1

Physical properties of selected polymer sorbents and corresponding CO$_2$ capacity.

| Sorbents | Surface area (m$^2$/g) | Pore volume (cm$^3$/g) | Pore size (nm) | CO$_2$ capacity (mmol/g) | CO$_2$ capacity (wt %) |
|---|---|---|---|---|---|
| CMK-3 | 1352 | 1.40 | 3.9 | 1.55 | 6.4 |
| 17% PEI-CMK-3 | 1248 | 1.26 | 3.4 | 2.00 | 8.1 |
| 28% PEI-CMK-3 | 950 | 0.66 | 3.2 | 2.36 | 9.4 |
| 39% PEI-CMK-3 | 774 | 0.49 | 2.9 | 3.13 | 12.1 |
| 52% PEI-CMK-3 | 134 | 0.19 | 0.5 | 0.49 | 2.1 |
| 21% PVA-CMK-3 | 1106 | 1.25 | 3.4 | 2.60 | 10.3 |
| 30% PVA-CMK-3 | 868 | 0.61 | 3.1 | 3.49 | 13.3 |
| 37% PVA-CMK-3 | 711 | 0.46 | 2.9 | 3.52 | 13.4 |
| 54% PVA-CMK-3 | 112 | 0.20 | 0.3 | 0.54 | 2.3 |
| 40% PEI-CMK-3 (imp) | 315 | 0.27 | 0.6 | 1.95 | 7.9 |
| 40% PVA-CMK-3 (imp) | 237 | 0.22 | 0.6 | 1.48 | 6.1 |

Pure CMK-3 has a high surface area of 1350 m$^2$/g with its pore volume of 1.40 cm$^3$/g and pore diameter of 3.9 nm. The actual loading of each polymer in the CMK-3 was determined by thermogravimetric analysis (TGA). The PEI-CMK-3 and PVA-CMK-3 behave similarly as their loadings were increased up to ~40 wt %. As the polymer loading of CMK-3 increased, the more meso- and microchannels were occupied, leading to a corresponding decrease in the surface area and pore volume. As the polymer loading increased to over 50%, less than ⅒ original surface area and pore volume remained, causing mesopore blockage.

In addition to the monomer-infused composites, Applicants also tried direct polymer impregnation to yield PEI-CMK-3 (imp.) and PVA-CMK-3 (imp.). These latter polymer-impregnated composites had lower surface areas and pore volumes than those made by the original in situ polymerization (Table 1). Hence, channel blockage results from this approach.

EXAMPLE 2

CO$_2$ Absorption by PEI-CMK-3 and PVA-CMK-3 Composites

Thermogravimetric analysis (TGA) was applied to evaluate the potential absorption of CO$_2$ for the PEI-CMK-3 and PVA-CMK-3 composites. All of samples were pretreated at 100° C. under argon to remove moisture and other adsorbates. Once the chamber was cooled and temperature equilibrium (30° C.) was achieved, the gas flow in the TGA instrument was switched to CO$_2$ so as to pass through the sorbents. The CO$_2$ capacities of the sorbents with various amine species and loadings were measured at 30° C. and 1 atm. The results are summarized in Table 1. A capacity of 1.55 mmol/g was obtained after feeding $CO_2$ to the pure CMK-3 over 30 min. In the case of PEI-CMK-3 composites, the adsorption quickly reached a plateau with $CO_2$ uptake capacities between 2.00 and 3.13 mmol/g as the PEI loading of the CMK-3 increased from 17 to 39 wt %. The capacities of the PVA-CMK-3 sorbents were improved from 2.60 to 3.52 mmol/g with respect to similar PEI loadings. The $CO_2$ capacities for the PEI-CMK-3 (imp.) and PVA-CMK-3 (imp.) were almost 2-fold less than that of PEI-CMK-3 and PVA-CMK-3 sorbents made through the in situ polymerization method. The decreases in their $CO_2$ capacities were likely due to plugging of the pores by polymer chains. Also higher loadings of polymers (such as 52% PEI-CMK-3 and 54% PVA-CMK-3) were likely blocking the mesoporous channels causing $CO_2$ diffusional limitations. These results are also summarized in Table 1.

Figure 4:
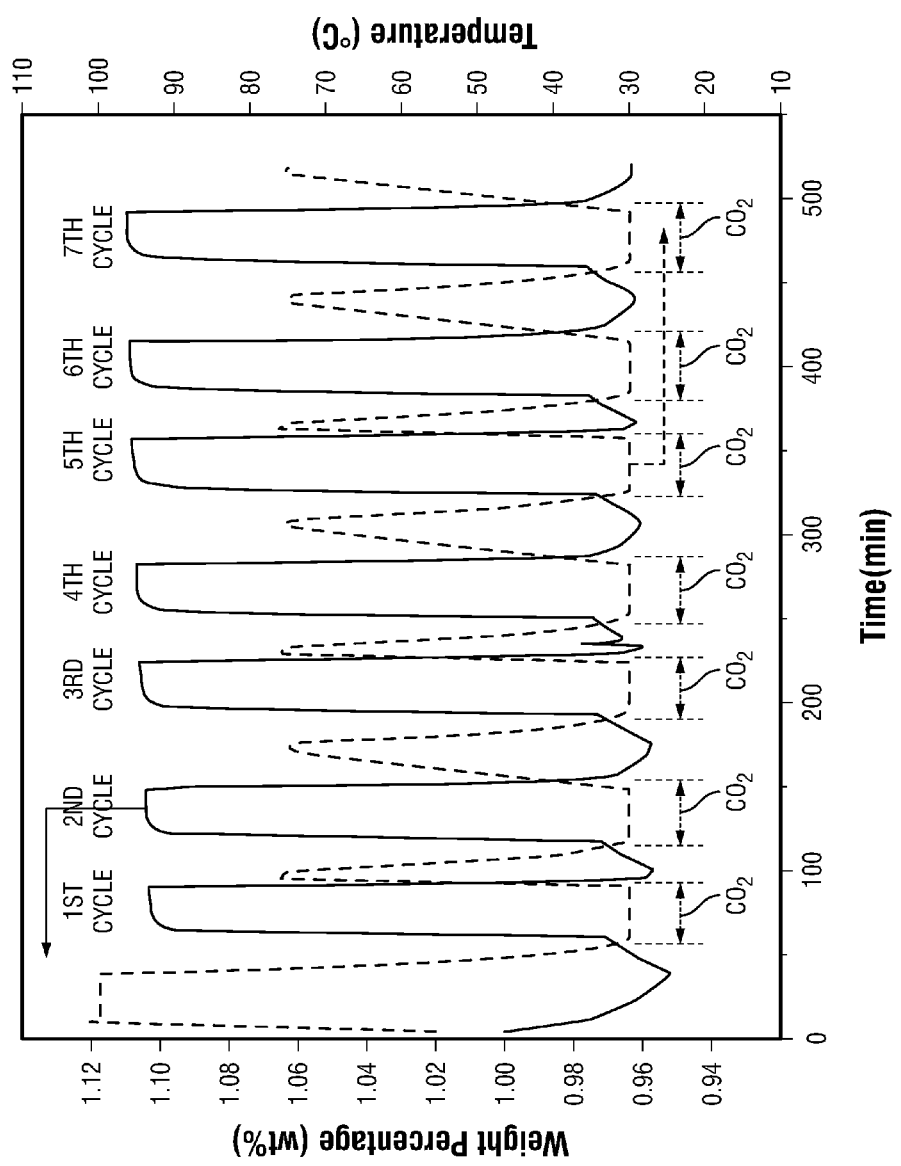
FIG. 4 provides adsorption cycles of $CO_2$ studied by thermogravimetric analysis (TGA) at 30° C. on the 37% PVA-CMK-3 sorbent. The composite was first pretreated at 100° C. under argon to remove moisture and residual $CO_2$ followed by dosing with 100% $CO_2$ gas stream (30° C., 1 atm) for 30 min. After the first adsorption cycle, the cycling was repeated by heating the adsorbent to 75° C. under argon for regeneration.

In addition to the high $CO_2$ capture efficiency, long-term stability and low-cost regeneration are also important concerns for any $CO_2$ capture system. In this case, as $CO_2$ was introduced into the sorbents, each $CO_2$ uptake cycle is a two-stage process, with the mass increasing significantly in the first stage in less than 5 min, followed by a second much slower absorption process until a stable maximum was reached (FIG. 4). This two-stage adsorption kinetics had been observed in other amine-impregnated sorbents. Note that the capacity of the 37% PVA-CMK-3 is higher than 13 wt % within the first $CO_2$ exposure stage. The rapid capture process is desirable for shortening the $CO_2$ absorption time. In order to check the stability of the composite sorbents, after the first absorption cycle, the cycling was repeated by heating the PEI-CMK-3 and PVA-CMK-3 composites to 75° C. under argon gas for regeneration, followed by cooling to room temperature for another $CO_2$ capture. The 75° C. regeneration temperature is lower than that needed for silica-based amine sorbents, which is usually higher than 100° C.

Figure 5A:
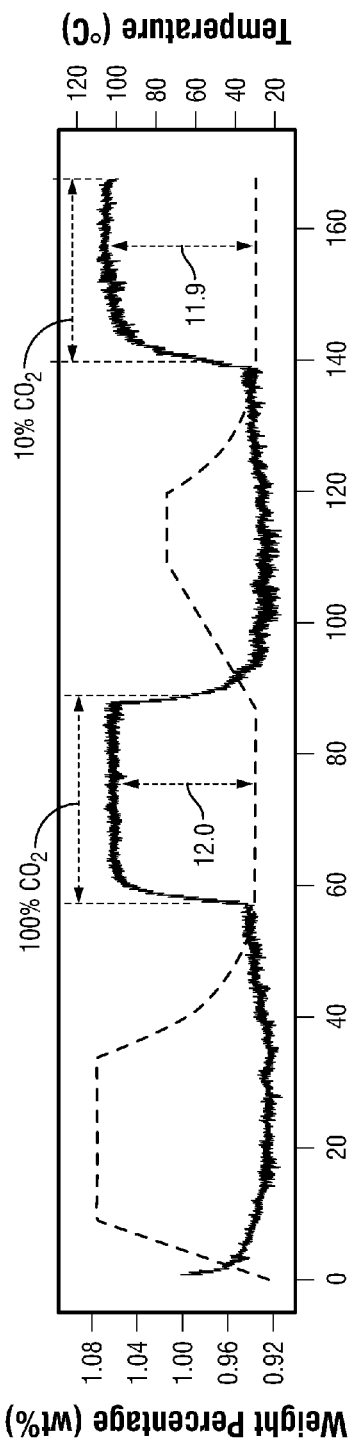
FIG. 5 shows $CO_2$ uptake tests on PEI-CMK-3 (FIG. 5A) and PVA-CMK-3 (FIG. 5B). The first uptake used pure $CO_2$, followed by the second uptake using 10% $CO_2$ flow (the balance was 85% $CH_4$, 3% $C_2H_5$ and 2% $C_3H_8$).
FIG. 5C shows pure methane adsorbed on the PVA-CMK-3 composite.
Figure 5B:
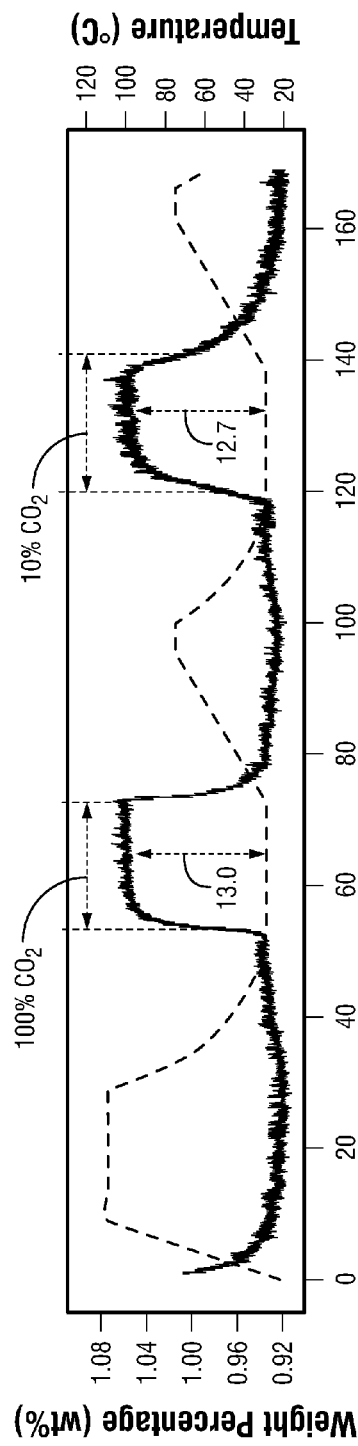
Figure 5C:
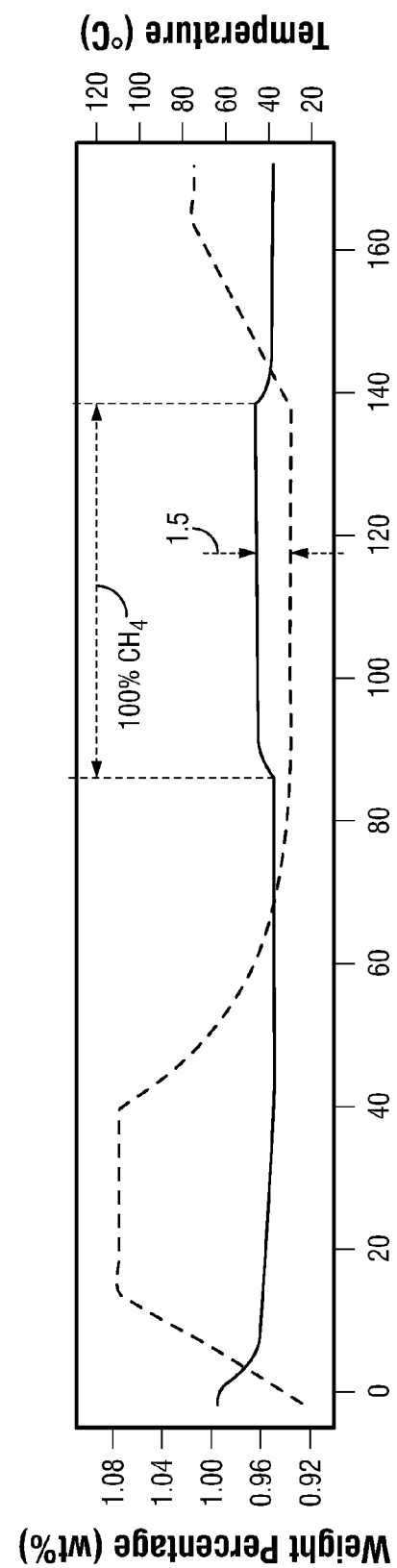

Applicants also replaced the 100% $CO_2$ flow with a 10% $CO_2$ in alkane gas (composed of 85% $CH_4$, 3% $C_2H_6$ and 2% $C_3H_8$) in order to mimic a natural gas field. The result still showed ~12 wt % maximum $CO_2$ uptake capacity for PEI-CMK-3 and ~13 wt % for PVA-CMK-3 (FIGS. 5A-5B). When $CH_4$ was used as the pure gas feed, only 1.5 wt % $CH_4$ capacity was observed (FIG. 5C). Hence, there is selectivity between $CO_2$ and $CH_4$ gas.

In conclusion, Applicants have synthesized new and efficient $CO_2$ adsorbents based on amine-modified mesocarbon CMK-3 composites through in situ polymerization. The synthesis process results in the entrapped polymers interpenetrating the composite frameworks of the mesocarbon CMK-3. A $CO_2$ absorption capacity of 3.52 mmol/g (13.4 wt %) was obtained, which is more than twice that of the pure CMK-3. The sorbents are readily and fully regenerated at a relatively low temperature, they exhibit stability over repetitive adsorption-desorption cycles, and there is $CO_2$ selectivity over alkane gases.

EXAMPLE 3

Experimental Protocols

EXAMPLE 3.1

Synthesis of CMK-3

Mesoporous silica SBA-15 was used as a hard template to prepare mesocarbon CMK-3 as in a previous report (*Science* 1998, 279, 548-552). In a typical preparation of SBA-15, $EO_{20}PO_{70}EO_{20}$ (Pluronic P123, 4.0 g) was dissolved in a solution of water (30 mL) and 2 M HCl (100 mL) with stirring at 35° C. Tetraethylorthosilicate (TEOS, 8.50 g) was added into that solution with stirring at 35° C. for 20 h. The mixture was heated at 100° C. overnight without stirring. The solid product was recovered, washed, and vacuum dried at 100° C. Calcination was carried out by slowly heating from room temperature in air to 500° C. over 8 h and then heating at 500° C. for 6 h.

The resulting mesoporous silica SBA-15 (0.50 g) was added to a solution of sucrose (0.625 g, 1.8 mmol, EMD Chemicals), $H_2SO_4$ (18 M, 0.04 mL, Fisher Scientific) and $H_2O$ (5 mL, 277.8 mmol) in a 20 mL sample vial. After stirring 2 h at room temperature, the white slurry was dried in the vial at 100° C. for 6 h and then at 160° C. for another 6 h under air. The product was light brown, and was removed from the vial, ground with a mortar and pestle, then placed back in the vial. Second portions of sucrose (0.40 g, 1.2 mmol), water (5 mL, 277.8 mmol) and conc. $H_2SO_4$ (18 M, 0.03 mL) were added into the dried mixture, and the resulting dark brown slurry was stirred for 2 h at room temperature. The mixture was heated again in the same vial in an oven at 100° C. for 6 h and then 160° C. under air. The black product was removed from the vial and powdered using a mortar and pestle. Next, the powder was placed in a ceramic boat in a furnace and carbonized at 900° C. for 6 hours under Ar. After cooling, the carbonized black powder was poured into a polypropylene bottle with 10% aqueous HF (400 mL), and the slurry was stirred for 6 hours to remove the $SiO_2$. The slurry was filtered, and the filter cake was washed with water until the filtrate was neutral by litmus paper. The filter cake was dried at 100° C. in a vacuum oven overnight to yield mesocarbon CMK-3 (0.50 g).

EXAMPLE 3.2

Synthesis of PEI-CMK-3

For the synthesis of the PEI-CMK-3 composite, CMK-3 (0.50 g) was suspended in a solution containing 2-methyl-2-oxazoline (0.15 g, 1.8 mmol) and acetonitrile (1.85 g, 45.1 mmol) in a 20 mL sample vial and the black slurry was stirred for 6 h at room temperature. Then the acetonitrile was evaporated in a vacuum oven overnight at 80° C., followed by adding a catalytic amount of $BF_3.Et_2O$ (0.007 g, 0.05 mmol) to the product. The sealed vial was subsequently heated in an oven for 12 h at 90° C. for the polymerization step. The powder was transferred to a 250 mL round-bottom flask that contained 2 M aqueous NaOH (100 mL). The mixture was stirred and heated at 90° C. for 12 h. After cooling, the powder was recovered by filtration and the filter cake was washed with water until the filtrate was neutral to litmus paper. The product was dried in an oven at 100° C. overnight to yield ~0.70 g of PEI-CMK-3 composite.

EXAMPLE 3.3

Synthesis of PVA-CMK-3

The PVA-CMK-3 composite was synthesized in a similar fashion: CMK-3 (0.50 g), N-vinylformamide (0.30 g, 4.3 mmol) and 2,2'-azobis(2-methylpropionitrile) (AIBN, 0.03 g, 0.02 mmol) were mixed in THF (1.76 mL, 1.56 g, 21.7 mmol) and the mixture was stirred in a 20 mL sample vial for 6 h at room temperature. The vial was then heated in a 55° C. vacuum oven overnight. Additional portions of N-vinylformamide (0.30 g, 4.3 mmol) and 2,2'-azobis(2-methylpropionitrile) (AIBN, 0.03 g, 0.02 mmol) were added and the sealed vial was heated in a 90° C. oven for 12 h to produce a dark gray solid. The powder was transferred to a 250 mL round-bottom flask that contained 2 M aqueous NaOH (100 mL). The mixture was stirred and heated at 90° C. for 12 h. After cooling, the powder was recovered by filtration and the filter cake was washed with water until the filtrate was neutral to litmus paper. The product was dried in a vacuum oven at 80° C. overnight to yield 0.70 g of PVA-CMK-3.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A composite material for $CO_2$ capture comprising:
   a) a mesoporous carbon source comprising a plurality of pores; and
   b) an in situ polymerized polymer embedded within and inseparable from the plurality of pores of the mesoporous carbon source,
      wherein the in situ polymerized polymer is selected from the group consisting of thiol-based polymers, amine-based polymers, and combinations thereof; and
      wherein the composite material comprises a crystalline structure.

2. The composite material of claim 1, wherein the mesoporous carbon source is selected from the group consisting of amorphous carbons, carbon black, hydroxide-treated carbon black, porous carbon black, activated carbons, and combinations thereof.

3. The composite material of claim 1, wherein the mesoporous carbon source is derived from micron-sized or nanometer-sized carbon black particles that were treated with hydroxide.

4. The composite material of claim 3, wherein the mesoporous carbon source comprises pores with diameters that range from about 5 nm to about 100 nm.

5. The composite material of claim 1, wherein the mesoporous carbon source is CMK-3.

6. The composite material of claim 1, wherein the in situ polymerized polymer comprises an amine-based polymer selected from the group consisting of polyethylenimines, polyvinylamines, polyaziridines, N-substituted polyaziridines, poly(N-vinylformamide), Jeffamines, and combinations thereof.

7. The composite material of claim 1, wherein the in situ polymerized polymer comprises a thiol-based polymer selected from the group consisting of polyalkylthiols, polydialkylthiols, polyarylthiols, and combinations thereof.

8. A method of making a composite material for $CO_2$ capture, wherein the method comprises:
   a) associating a mesoporous carbon source comprising a plurality of pores with monomers, wherein the monomers are selected from the group consisting of thiol-based monomers, amine-based monomers, and combinations thereof; and
   b) polymerizing the monomers in situ to form at least one in situ polymerized polymer embedded within and inseparable from the plurality of pores of the mesoporous carbon source,
      wherein the in situ polymerized polymer is selected from the group consisting of thiol-based polymers, amine-based polymers, and combinations thereof; and
      wherein the composite material comprises a crystalline structure.

9. The method of claim 8, further comprising a hydrolysis of the formed composite material.

10. The method of claim 8, wherein the associating comprises mixing the mesoporous carbon source with the monomers.

11. The method of claim 8, wherein the polymerizing comprises the addition of a catalyst to the monomers.

12. The method of claim 8, wherein the monomers comprise amine-based monomers selected from the group consisting of 2-methyl-2-oxazoline, N-vinyl formamide, aziridine, and combinations thereof.

13. The method of claim 8, wherein the monomers comprise thiol-based monomers selected from the group consisting of alkylthiols, dialkylthiols, arylthiols, thioepoxides, vinylthioacetates, and combinations thereof.

14. A method of capturing $CO_2$ from an environment, wherein the method comprises:
   associating the environment with a composite material, wherein the composite material comprises:
   a) a mesoporous carbon source comprising a plurality of pores, and
   b) an in situ polymerized polymer embedded within and inseparable from the plurality of pores of the mesoporous carbon source,
      wherein the in situ polymerized polymer is selected from the group consisting of thiol-based polymers, amine-based polymers, and combinations thereof; and
      wherein the composite material comprises a crystalline structure.

15. The method of claim 14, wherein the environment comprises at least one of an industrial gas stream or a natural gas stream.

16. The method of claim 14, wherein the mesoporous carbon source is selected from the group consisting of amorphous carbons, carbon black, hydroxide-treated carbon black, activated carbons, and combinations thereof.

17. The method of claim 14, wherein the in situ polymerized polymer comprises an amine-based polymer selected from the group consisting of polyethylenimines, polyvinylamines, polyaziridines, N-substituted polyaziridines, poly(N-vinylformamide), Jeffamines, and combinations thereof.

18. The method of claim 14, wherein the in situ polymerized polymer comprises a thiol-based polymer selected from the group consisting of polyalkylthiols, polydialkylthiols, polyarylthiols, and combinations thereof.

19. The method of claim 14, wherein the composite has a $CO_2$ absorption capacity from about 10% to about 100% of the composite weight.

20. The method of claim 14, wherein the composite has a $CO_2$ absorption capacity of about 15% of the composite weight.

21. The composite material of claim 1, wherein the in situ polymerized polymer comprises at least one of cross-linked polymers, branched polymers, and combinations thereof.

22. The method of claim 8, wherein the in situ polymerized polymer comprises at least one of cross-linked polymers, branched polymers, and combinations thereof.

23. The method of claim 14, wherein the in situ polymerized polymer comprises at least one of cross-linked polymers, branched polymers, and combinations thereof.

* * * * *